United States Patent [19]
Motta et al.

[11] Patent Number: 5,577,535
[45] Date of Patent: Nov. 26, 1996

[54] METHOD AND EQUIPMENT FOR THE REPAIR OF THE OUTER LAYER OF SUBMARINE FLEXIBLE PIPINGS

[75] Inventors: Antonio M. R. Motta, Bloco A-Rio de Janeiro; Ney R. S. Dos Reis, Rio de Janeiro; Cézar J. M. Del Vecchio, Niteroi-Brazil, all of Brazil

[73] Assignee: Petroleo Brasileiro S.A. - Petrobras, Rio de Janeiro, Brazil

[21] Appl. No.: 516,940

[22] Filed: Aug. 18, 1995

[30] Foreign Application Priority Data

Aug. 19, 1994 [BR] Brazil ..................... 9403284

[51] Int. Cl.$^6$ ........................ F16L 55/16
[52] U.S. Cl. .................... 138/99; 138/97
[58] Field of Search ............... 138/97, 99, 156, 138/158; 294/88, 66.1, 106; 405/158; 285/15

[56] References Cited

U.S. PATENT DOCUMENTS

| 3,502,112 | 3/1970 | Hankila ................................ 138/99 |
| 4,535,822 | 8/1985 | Rogers, Jr. ........................... 138/99 |
| 5,437,489 | 8/1995 | Sanders et al. ................. 138/99 X |

FOREIGN PATENT DOCUMENTS

| 109624 | 8/1979 | Japan ...................... 138/99 |
| 1725008 | 4/1992 | U.S.S.R. .................. 138/99 |
| 210647 | 2/1924 | United Kingdom ............ 138/99 |
| 648581 | 1/1951 | United Kingdom ............ 138/99 |

*Primary Examiner*—Patrick Brinson
*Attorney, Agent, or Firm*—Sughrue, Mion, Zinn, Macpeak & Seas

[57] ABSTRACT

A method for repairing the outer layer of a submarine flexible pipe involves applying a resin mantle which is curable on contact with water to a damaged region of the outer layer of the flexible pipe. In order to do this, a sleeve of flexible material is provided having a resin mantle applied to an inner surface thereof. The sleeve is provided with a longitudinal slit and external slots on opposite sides of the slit. A tool is provided having hydraulically operated arms with claws at the ends thereof which engage in the external slots of the sleeve to move the sleeve to an open position. The sleeve is then applied in the open condition over the flexible pipe with the resin mantle in contact with the damaged region of the outer layer of the flexible pipe. Upon operating the tool, the sleeve is closed, thereby pressing the resin mantle against the damaged region of the outer layer of the flexible pipe. After the resin mantle has reached a gel point, the tool may be operated to remove the tool from the sleeve.

2 Claims, 2 Drawing Sheets

METHOD AND EQUIPMENT FOR THE REPAIR OF THE OUTER LAYER OF SUBMARINE FLEXIBLE PIPINGS

BACKGROUND OF THE INVENTION

This invention relates to a method for the repair of the outer layer of the submarine flexible lines which are normally used to carry away the oil produced by a well. Flexible lines are subject to frequent damage, for example, due to abrasion by contact with the structure of an off-shore platform.

The oil produced by submarine oil wells equipped with wet christmas trees usually flows away to a processing unit at the surface, by means of special flexible pipings which comprises several layers of diverse functions. The outer layer is made of highly resistant synthetic fibre, the function of which is to protect from corrosion the inner layer of the steel mail or mesh that makes the pipe resistant to tension and to pressure (crushing). The segment of the flexible piping that brings the oil from the bottom of the sea to the unit at the surface is called a "riser" by the experts in the art of submarine oil wells.

When in operation, the coating of the risers frequently becomes damaged by abrasion upon contact with the structural parts of the processing unit at the surface, as result of operational conditions. When the damage affects the inner layer of the steel mesh or mail, the structure becomes exposed to corrosion, thus weakening the flexive piping or rendering it useless.

When a damaged region is detected along the flexible piping, the process of moving it mechanically is adopted immediately.

Next the repair is performed on the exposed metallic layer applying anticorrosive adhesive tapes and putting on them new layers of filamentary tape for reinforcement.

This repair method, commonly used in this kind of damage, has as a deficiency fact that the filamentary adhesive tape placed there as protection has a low resistance to abrasion and to cutting and this may cause a new occurrence of failure within a short period of time. The method of applying it, by means of divers, is slow and lengthy due to the limited autonomy of the diver, thus requiring several diving operations.

SUMMARY OF THE INVENTION

The present invention aims to introduce a simple and effective method for the repair of damages caused by abrasion on the outer layer of submarine flexible piping and to reduce considerably the time spent on the repairs of such damages due to the utilization of hydraulic tools specifically developed for such operation.

The purpose of this invention is to provide a method for the repair of the outer layer of submarine flexible piping intended to transport, to offshore platforms, fluids produced in submarine oil wells. It consists in applying an abrasion- and cut- resistant resin mantle on the damaged surface of the flexible piping by means of a sleeve made of flexible material, which in turn is placed on top of it using a special hydraulic tool that serves as a containment cast for curing the resin.

BRIEF DESCRIPTION OF THE DRAWINGS

In order that that the present invention may more readily be understood the following description is given, merely by way of example, with reference to the accompanying drawings in which.

DETAILED DESCRIPTION OF THE INVENTION

The method of this invention consists in applying a resin mantle 2 on the damaged region of the outer layer of the flexible piping. The resin mantle 2, shown in FIG. 1, has the property of curing point upon contact with the water, thus satisfactorily resisting abrasions and cuts.

The resin is prepared in advance and placed, in the form of gel, on the inner face of the also abrasion-resistant sleeve flexible material which has a longitudinal slit 3 to allow for it to be opened by means of an hydraulic tool 13, the assembly of the open sleeve 1 of flexible material and resin mantle 2 is placed over the damaged region of the flexible piping and envelops it completely.

Figure 1:
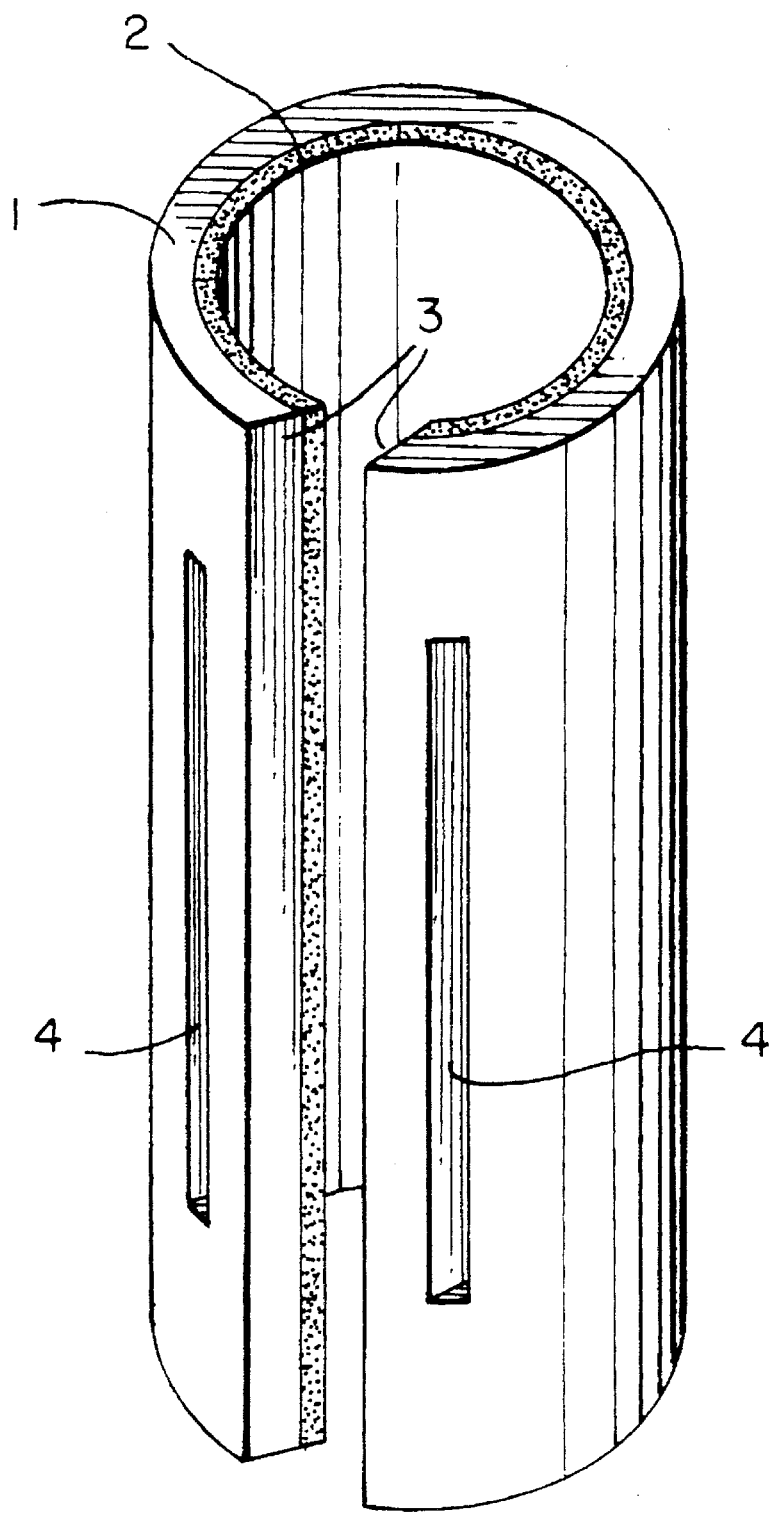
FIG. 1 is an overall view of the sleeve with the resin in the form of gel applied along the whole inner face.

FIG. 1 shows the assembly of the flexible material sleeve set 1, the purpose of which is to hold and to apply the resin mantle 2 in place on the damaged area of the flexible piping.

Figure 2:
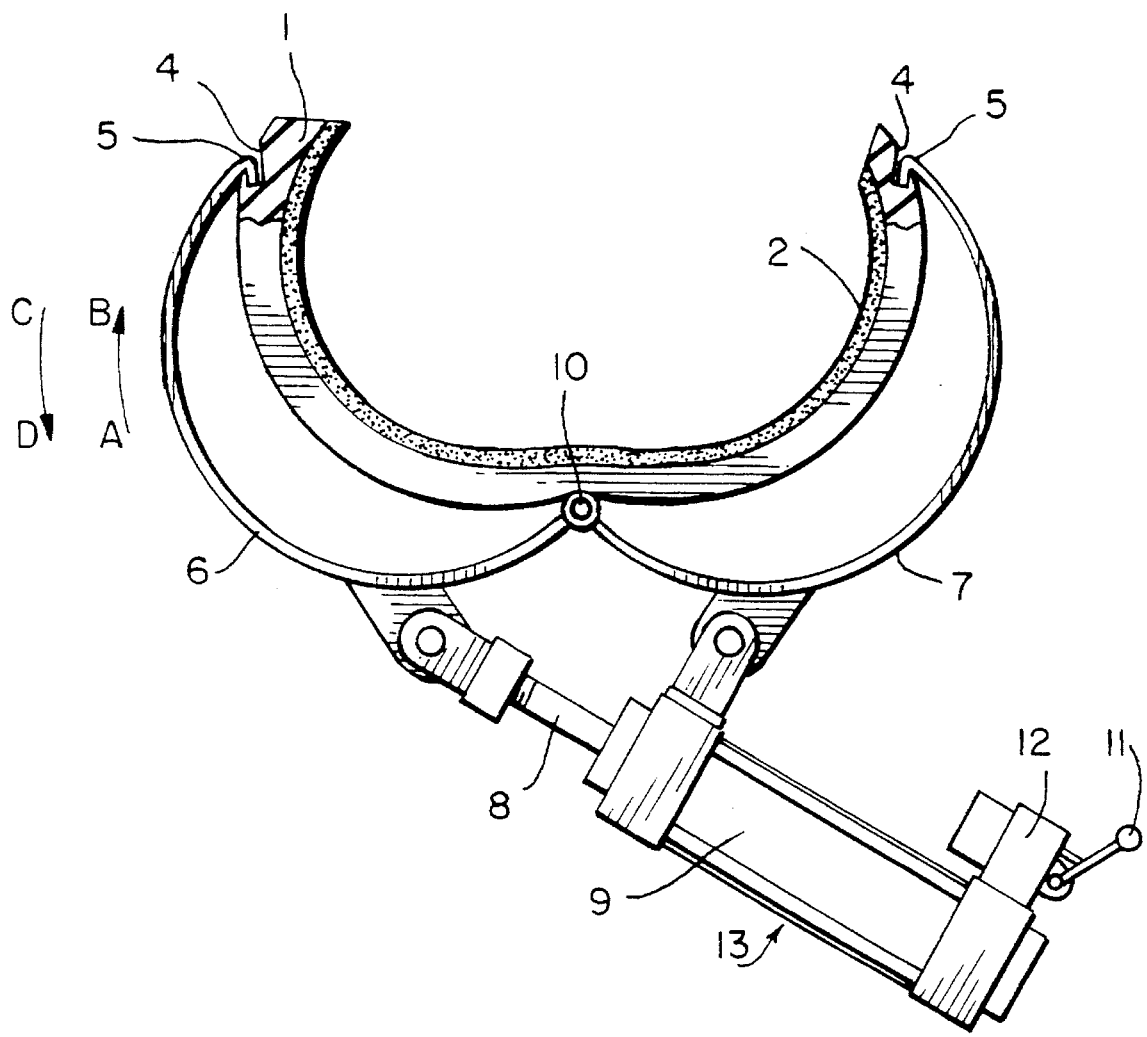
FIG. 2 is an overall view of the hydraulic tool with the sleeve held open ready to be placed around the piping.

In order to allow for a perfect abutment of, and union between, the surfaces of the slit 3 in the sleeve 1 of flexible material after its placement around the flexible piping, the sleeve 1 of flexible material has slots 4 along its length, to receive the claws 5 at the ends of arms 6 and 7 of the hydraulic tool 13 shown in FIG. 2, to enable the tool 13 to hold the sleeve 1 open.

The hydraulic tool 13 is intended to Keep the flexible material sleeve 1 open during the assembly of the flexible piping, and this holding is achieved by means of the movable arm 6 that opens when driven by retraction of the piston rod 8 of the cylinder 9 rotating anticlockwise around the articulation point 10. This is achieved by means of manipulating the operating lever 11 of the valve 12 on the cylinder 9.

Driving of the operating lever 11 of the valve 12 in the opposite direction causes the hydraulic tool 13 to close, by means of the extension of the piston red 8 of the cylinder 9 and the consequent clockwise rotation of the movable arm 6 around the articulation point 10, as suggested by arrow A8.

By maintaining the sleeve 1 of flexible material compressing the resin mantle 2 against the damaged region of the flexible piping, the hydraulic tool 13 serves as a containment cast at least until the resin reaches its gel point.

Next the hydraulic tool 13 is removed, by movement of the operating lever 11 of the valve 12 in the opposite direction, causing retraction of the piston rod 8 of the cylinder 9 and the consequent rotation of the movable arm 6 in the anticlockwise direction (arrow CD) around the articulation point 10, thus causing arms 6 and 7 of the tool 13 to open to release the tool for removal off the piping (not shown) being repaired.

After removal of the tool, the sleeve 1 of flexible material keeps the mantle fixed upon the pipe, through its own spring effect and through the hydrostatic pressure of the environment, until the curing is completed.

Feed of the control valve 12 can be made by means of fluid coming from an independent hydraulic unit. However, it ought to be stressed that the use of any other kind of feed is also possible; for instance, it is possible to use a small integrated manual pump and reservoir set fixed to the hydraulic cylinder 9 and driven manually by a diver.

In the present embodiment the flexible material of the sleeve 1 is polyurethane, which offers good resistance to abrasion, to tearing, and to attack by chemical products. This gives the sleeve 1 the ability to protect the resin mantle. However, it may instead be made of any other material with similar features.

We claim:

1. A method for repairing an outer layer of a submarine flexible pipe comprising the steps of providing a sleeve of flexible material having a longitudinal slit and external slots adjacent said slit and a water curable resin mantle on an inner surface of the sleeve, providing a tool having a pair of arms, each arm including a claw at one end thereof for engaging said external slots, operating said arms to open said sleeve and maintain said sleeve in an open position, applying the flexible sleeve in said open position over a damaged region of the outer layer of the flexible pipe with said resin mantle in contact with said damaged region of said flexible pipe, operating said arms to close the sleeve and mantle about said pipe and pressing said flexible sleeve against said resin mantle to compress the resin mantle against the damaged region of the outer layer of the flexible pipe and operating said arms after the resin mantle has reached a gel point to remove said claws from said slots.

2. A method as set forth in claim 1, wherein the closing of the tool onto the flexible sleeve is effected by extending a hydraulic ram to operate said arms, spreading the sleeve is effected by retracting said ram, closing the sleeve onto the piping is effected by extending said ram and removal of the claws from the sleeve is effected by again retracting the ram.

* * * * *